United States Patent
Xu et al.

(10) Patent No.: US 11,830,156 B2
(45) Date of Patent: Nov. 28, 2023

(54) AUGMENTED REALITY 3D RECONSTRUCTION

(71) Applicant: GUANGDONG OPPO MOBILE TELECOMMUNICATIONS CORP., LTD., Guangdong (CN)

(72) Inventors: Yi Xu, Palo Alto, CA (US); Shuxue Quan, Palo Alto, CA (US)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 72 days.

(21) Appl. No.: 17/728,022

(22) Filed: Apr. 25, 2022

(65) Prior Publication Data

US 2022/0254121 A1 Aug. 11, 2022

Related U.S. Application Data

(63) Continuation of application No. PCT/CN2020/115306, filed on Sep. 15, 2020.

(Continued)

(51) Int. Cl.
*G06T 19/00* (2011.01)
*G06T 15/06* (2011.01)
(Continued)

(52) U.S. Cl.
CPC ............ *G06T 19/006* (2013.01); *G06T 15/06* (2013.01); *G06T 17/10* (2013.01); *H04N 13/268* (2018.05);
(Continued)

(58) Field of Classification Search
None
See application file for complete search history.

(56) References Cited

U.S. PATENT DOCUMENTS

| | | | |
|---|---|---|---|
| 2009/0016572 A1* | 1/2009 | Hassebrook | G06V 10/145 382/106 |
| 2018/0114353 A1 | 4/2018 | Champion et al. | |

(Continued)

FOREIGN PATENT DOCUMENTS

WO 2019174377 9/2019

OTHER PUBLICATIONS

Mukasa et al., "3D Scene Mesh From CNN Depth Predictions And Sparse Monocular SLAM," IEEE International Conference on Computer Vision Workshops, 2017.

(Continued)

*Primary Examiner* — Tapas Mazumder
(74) *Attorney, Agent, or Firm* — Hodgson Russ LLP

(57) ABSTRACT

Techniques for rendering a 3D virtual object in an augmented-reality system are described. A system, a method, and a non-transitory memory device for augmented reality rendering of three-dimensional, virtual objects are described. In an example, a number of images of an environment are acquired; relative movement of a camera acquiring the number of images is tracked; camera pose is determined relative to the environment using the number of images and tracked relative movement of the camera; depth and normal surfaces of objects in the environment are estimated using a depth map and a normal map; a surface geometry of the environment is reconstructed using the depth map and the normal map; and the virtual object is rendered using the surface geometry of the environment.

20 Claims, 6 Drawing Sheets

Related U.S. Application Data

(60) Provisional application No. 62/927,347, filed on Oct. 29, 2019.

(51) Int. Cl.
  *H04N 13/268* (2018.01)
  *G06T 17/10* (2006.01)

(52) U.S. Cl.
  CPC ...... *G06T 2200/04* (2013.01); *G06T 2200/08* (2013.01)

(56) References Cited

U.S. PATENT DOCUMENTS

| | | | |
|---|---|---|---|
| 2018/0114553 A1* | 4/2018 | West | G06F 11/1048 |
| 2018/0350128 A1 | 12/2018 | Bakalash et al. | |
| 2019/0286231 A1* | 9/2019 | Burns | G06F 3/013 |
| 2019/0311546 A1 | 10/2019 | Tay et al. | |
| 2019/0325644 A1* | 10/2019 | Bleyer | G06T 17/20 |

OTHER PUBLICATIONS

Tang et al., "Sparse2Dense: From direct sparse odometry to dense 3D reconstruction", arXiv:1903.09199v1, 2019.

EPO, Extended European Search Report for EP Application No. 20881864.1, dated Dec. 20, 2022.

Kan et al., "High-Quality Reflections, Refractions, and Caustics in Augmented Reality and their Contribution to Visual Coherence," IEEE International Symposium on Mixed and Augmented Reality (ISMAR), 2012.

Santos et al., "Real Time Ray Tracing for Augmented Reality," 14th Symposium on Virtual and Augmented Reality, 2012.

"Localray: Ray Tracing Graphics Engine Scaling From High-End Gaming GPUs to mobile devices," retrieved from the internet: <https://www.adshir.com/>, 2014.

Qi et al., "GeoNet: Geometric Neural Network for Joint Depth and Surface Normal Estimation," IEEE/CVF Conference on Computer Vision and Pattern Recognition, 2018.

Eigen et al., "Predicting Depth, Surface Normals and Semantic Labels with a Common Multi-Scale Convolutional Architecture," IEEE International Conference on Computer Vision (ICCV), 2015.

Wang et al., "Surge: Surface regularized geometry estimation from a single image," 30th Conference on Neural Information Processing System (NIPS), 2016.

Labatut et al., "Robust and Efficient Surface Reconstruction From Range Data," Computer Graphics Forum, vol. 28, No. 8, 2009.

WIPO, International Search Report and Written Opinion for PCT/CN2020/115306, dated Dec. 15, 2020.

* cited by examiner

AUGMENTED REALITY 3D RECONSTRUCTION

CROSS REFERENCE TO RELATED APPLICATION(S)

This application is a continuation of International Application PCT/CN2020/115306, filed Sep. 15, 2020, which claims priority to U.S. Provisional Application No. 62/927,347, filed Oct. 29, 2019, the entire disclosures of which are incorporated herein by reference.

BACKGROUND

This disclosure relates in general to artificial reality, and more specifically, and without limitation, to reconstructing a three-dimensional scene for augmented reality. Technologies relating to artificial reality, such as virtual reality (VR), augmented reality (AR), mixed reality (MR), and the like, have made rapid progress. A system implementing an artificial-reality technology can include a device that allow digitally produced virtual objects, such as 3D virtual objects, to be overlaid in an image of a real-world environment, along with objects from the real-world environment. It can be challenging to accurately present a virtual object in, and/or interacting with objects from, the real-world environment.

SUMMARY

In some embodiments, a system for augmented reality rendering of three-dimensional and virtual objects is provided. The system includes a camera; an inertial measurement unit (IMU); and a memory device having instructions that when executed cause one or more processors to perform operations as follows. Based on a number of images acquired by the camera, at least one of depth and normal of surfaces in an environment relative to the camera are estimated, to obtain at least one of a depth map and a normal map of the environment. The at least one of the depth map and the normal map are aligned with a set of three-dimensional points, to determine at least one of a scale of the depth map and a scale of the normal map, where the set of three-dimensional points are calculated based on the number of images and data from the IMU. A surface geometry of the environment is reconstructed using the at least one of the depth map and the normal map and the at least one of the scale of the depth map and the scale of the normal map. A virtual object in the environment is rendered using the reconstructed surface geometry of the environment.

In some embodiments, a method for augmented reality rendering of three-dimensional and virtual objects is provided. The method includes operations as follows. Based on a number of images acquired by the camera, at least one of depth and normal of surfaces in an environment relative to the camera are estimated, to obtain at least one of a depth map and a normal map of the environment. The at least one of the depth map and the normal map are aligned with a set of three-dimensional points, to determine at least one of a scale of the depth map and a scale of the normal map, where the set of three-dimensional points are calculated based on the number of images and data from the IMU. A surface geometry of the environment is reconstructed using the at least one of the depth map and the normal map and the at least one of the scale of the depth map and the scale of the normal map. A virtual object in the environment is rendered using the reconstructed surface geometry of the environment.

In some embodiments, a non-transitory memory device for augmented reality rendering of three-dimensional and virtual objects is provided. The non-transitory memory device having instructions therein. When the instructions are executed, one or more processor is caused to perform the above-mentioned method.

BRIEF DESCRIPTION OF THE DRAWINGS

The present disclosure is described in conjunction with the appended figures.

Figure 1:
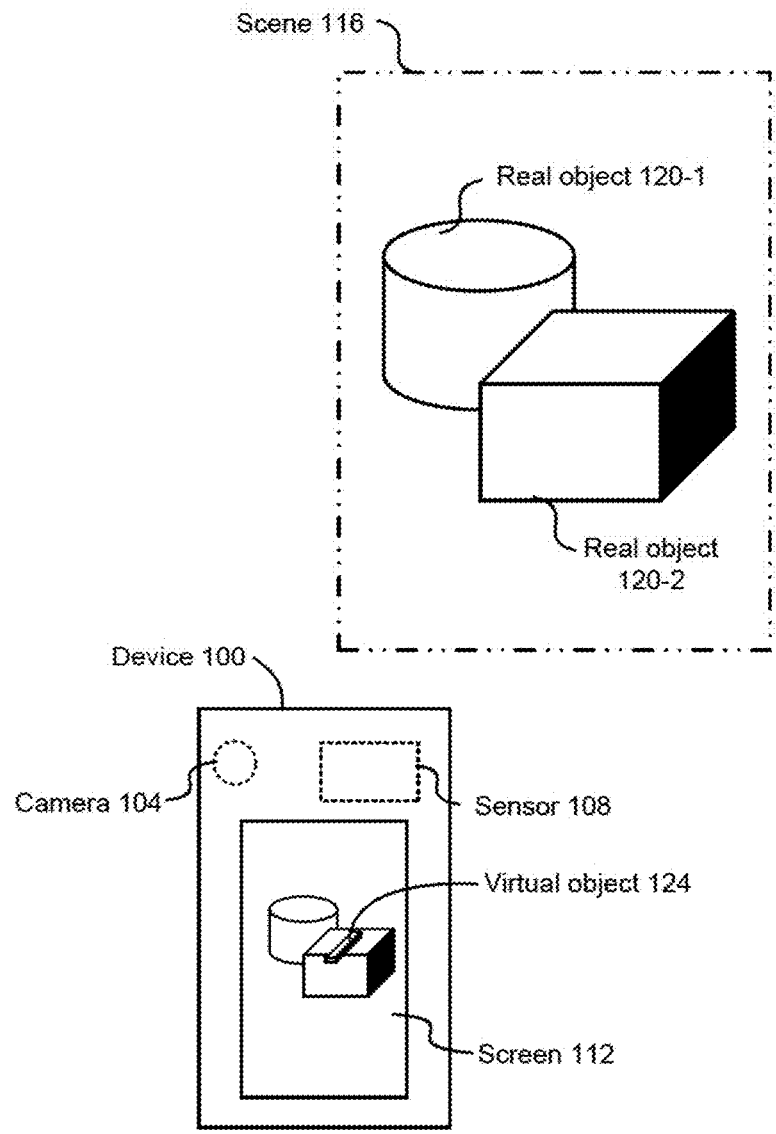
FIG. 1 depicts an embodiment of an augmented-reality device.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, rendering interactions of a virtual object in an augmented-reality system. In augmented reality, a virtual object is placed in a scene of real-world objects. It can be challenging to model lighting and/or interactions of the virtual object with real-world objects. In some embodiments, a 3D depth map and/or a 3D normal map is combined with SLAM (simultaneous localization and mapping) to enable 3D modeling of a scene for computing more accurate collision detection, collision response, and/or lighting of a virtual object interacting with a real object.

Ray tracing is a rendering technique for generating an image by tracing rays as pixels on an image plane and simulating effects of ray interactions with virtual objects. Ray tracing can be very computationally expensive. Thus, real time applications, particularly commercial artificial reality applications, commonly use rasterization techniques as their rendering approach. Compared to ray tracing, rasterization only computes the shading of each pixel regarding light sources; therefore, rasterization can be very fast. There are some research and commercial efforts that aim to enable ray tracing in artificial-reality applications. To properly trace rays through virtual and real environments, reconstructed surface geometry and/or material of the real environment is used. Some have proposed to use ray tracing to render global illumination effects, such as reflections, refractions, and caustics in artificial-reality scenarios using predefined models of a real-world scene. However, by using predefined models only simple geometries (such as a few diffuse boxes) can be manually defined. Others use a fisheye lens to capture an image of the environment. The image captured using the fisheye lens can be used to define a hemispherical environment map for rendering and for computing light source positions/color/intensities by using image processing techniques. However a warped perspective using a fisheye lens can lead to inaccurate lighting. Some have used a Kinect sensor. The Kinect sensor is used to acquire 3D geometry of a scene, so that complex scenes can be handled using a Kinect sensor. However, since no surface orientation (normal) information is available from Kinect output, tracing rays from real geometry to virtual geometry can be difficult because a direction light bounces off a real surface is unknown if surface orientation is unknown. Some have demonstrated ray tracing capability using a surface table, but do not model a scene; instead a marker is tracked, and a position and orientation of the marker is used to indicate a planar surface. Light sources are also manually added. There is a need for efficiently obtaining surface geometries of real-world objects to render a virtual object interacting with real-world objects in augmented reality. Obtaining surface geometries of real-world objects can enable more accurate ray tracing, collision detection, and/or collision response capabilities for augmented-reality applications.

Referring first to FIG. 1, an embodiment of a device 100 for providing augmented-reality is shown. The device 100 includes a camera 104, one or more sensors 108, and a screen 112. In some embodiments, the device 100 is a mobile device (e.g., smartphone or table) and/or a computer (e.g., laptop). In some embodiments, the device is part of a head-mounted display.

The camera 104 acquires an image of a scene 116. The camera 104 is directed toward the scene 116 (e.g., away from the screen 112). The device 100 can have more than one camera (e.g., a first camera facing away from the screen 112 and a second camera facing a user, directed opposite of the first camera). There are one or more real objects 120 in the scene 116. In the scene 116 in FIG. 1, there is a first real object 120-1 and a second real object 120-2. The first real object 120-1 is a cylinder. The second real object 120-2 is a box.

The image of the scene 116 is produced on the screen 112 with a virtual object 124. In FIG. 1, the virtual object 124 is a rectangular bar; the rectangular bar is rendered on the screen 112 on top of the box.

The sensor 108 can include one or more inertial sensors, such as gyroscopes and/or accelerometers. The sensor 108 can be an inertial measurement unit (IMU). An IMU and camera combined can provide relative pose of the device 100 (e.g., using a SLAM algorithm; visual inertial odometry). Pose can include three degrees of freedom of position (e.g., x, y, and z) and three degrees of orientation (e.g., roll, pitch, and yaw).

Figure 2A:
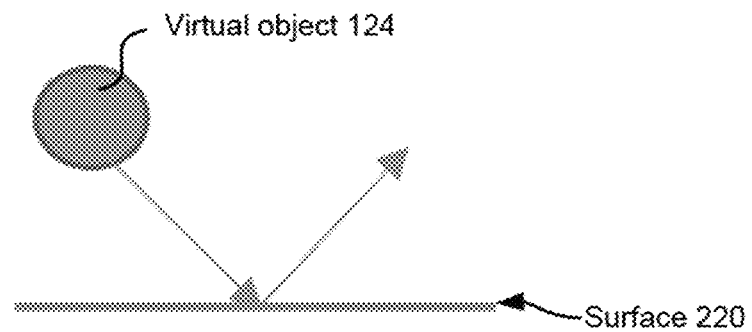
FIG. 2A illustrates an embodiment of correctly reconstructed geometry.
Figure 2B:
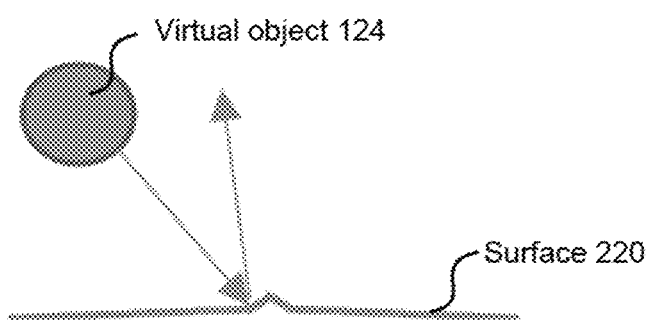
FIG. 2B illustrates an embodiment of potential errors in reconstructed geometry.

FIG. 2A illustrates an embodiment of correctly reconstructed geometry. FIG. 2B illustrates an embodiment of potential errors in reconstructed geometry. Reconstructed geometry of real objects can be important for detecting and/or modeling a collision of a virtual object 124 with a surface 220 of a real object, wherein the surface 220 is a reconstruction of the real object. Correctly modeling collisions of a virtual object 124 with a real object can be useful in many applications, such as in video games. To model a collision, a 3D model of the scene 116 is generated. The 3D model of the scene can include a depth map and/or a normal map. The depth map has values for depth (e.g., per pixel) of real surfaces. The normal map has values for orientations (e.g., per pixel) of real surfaces. In other words, the depth map includes a number of depth values per pixel of the images captured by the camera, and the normal map includes a number of normal values per pixel of the images captured by the camera. In FIG. 2A, the surface 220 correctly reconstructs a flat shape of the real object. The virtual object 124 in FIG. 2A is a ball. The ball is rendered to correctly bounce off the surface 220.

If the surface 220 does not accurately resemble a flat surface of a real object, as shown in FIG. 2B, then the ball bounces off the surface 220 at a different angle. By not accurately reconstructing surfaces (e.g., due to errors in a normal map), rendering collisions of a virtual object 124 can appear to a user as unnatural. Thus it can be desirable to accurately model surfaces of real objects for correctly rendering collisions of virtual objects 124.

Figure 3:
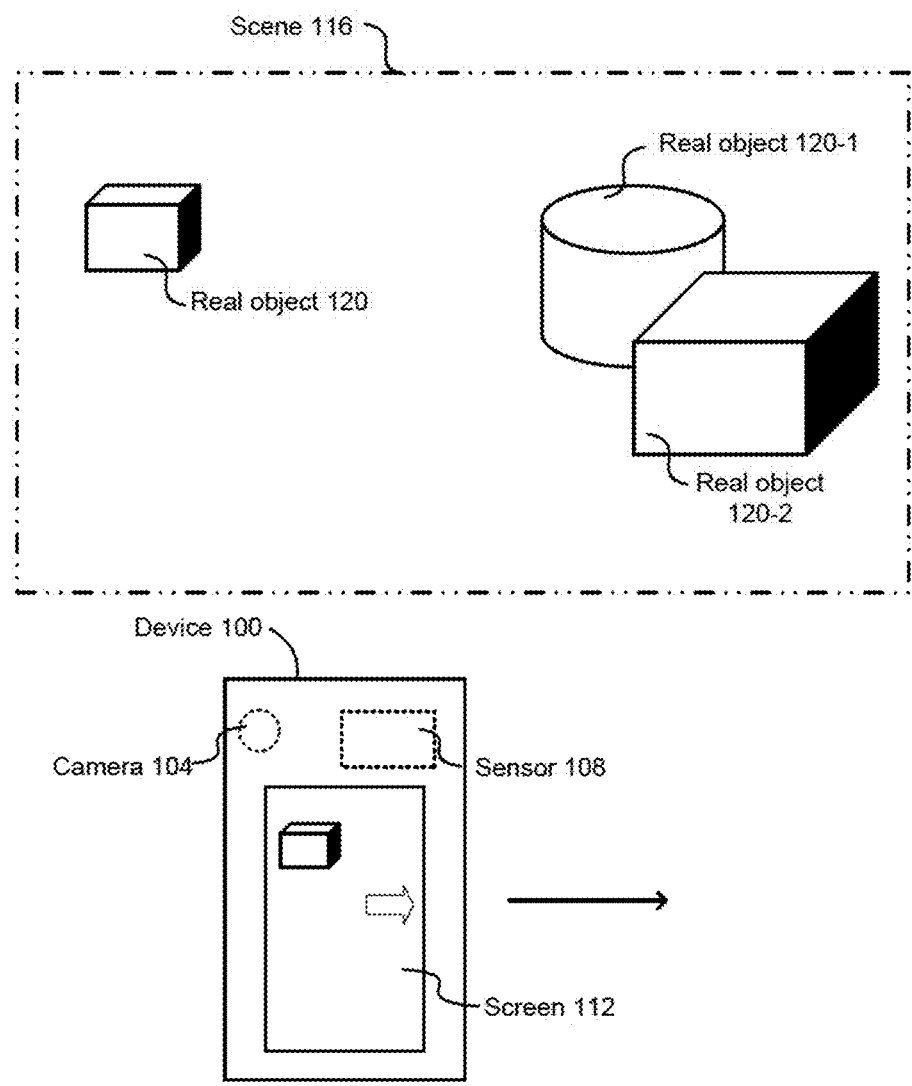
FIG. 3 depicts an embodiment of scanning an environment using an augmented-reality device.

FIG. 3 depicts an embodiment of scanning an environment using an augmented-reality device. When the device 100, or an application on the device 100, is started, an augmented-reality session is initiated. The application attempts to build a map around the user and track the pose of the device 100. For example, a simultaneous localization and mapping (SLAM) module is implemented. The SLAM module can provide relative pose, scale, and a set of 3D points (e.g., a sparse set of points). Example SLAM modules include ARKit, ARCore, and ARUnit. To facilitate scanning for SLAM, the user can be guided (e.g., by commands, text or symbols, displayed on the screen 112), to move the device 100 around to scan the scene 116 in a way that helps SLAM develop a solution. For example, a right arrow on the screen 112 can be used to instruct the user to move the device 100 to the right. Once the SLAM module successfully tracks the camera's position and orientation, augmented-reality features can be enabled. Often, one or more surfaces will be detected by a surface-detection algorithm. A user can place one or more virtual objects in a digital representation of the scene 116.

Figure 4:
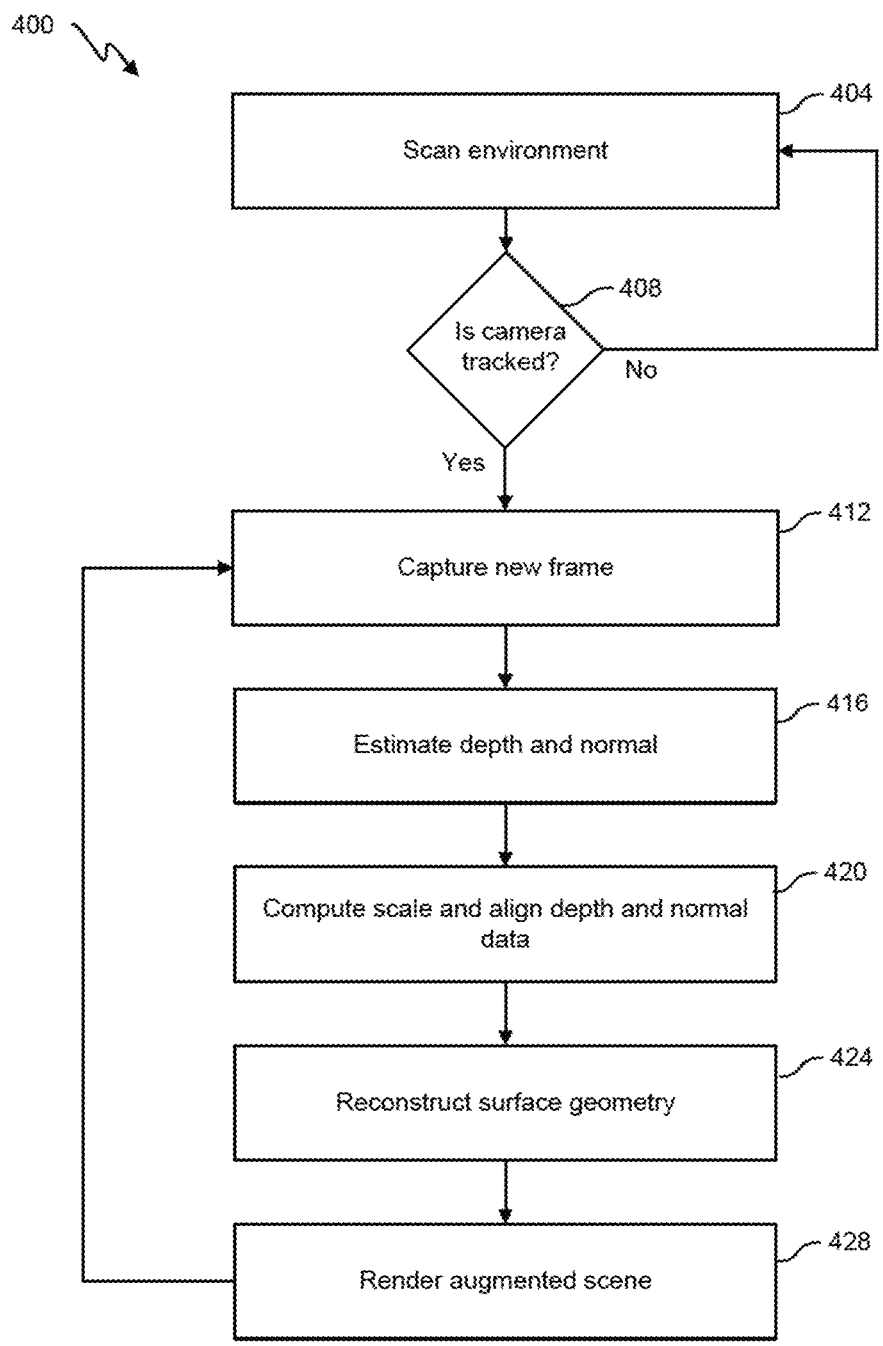
FIG. 4 illustrates a flowchart of an embodiment of a process for rendering of three-dimensional, virtual objects by an augmented-reality system.

FIG. 4 illustrates a flowchart of an embodiment of a process 400 for rendering of three-dimensional, virtual objects in an augmented-reality system. Process 400 begins in operation 404 with scanning the environment. A user may be instructed to move the device 100 around while the camera 104 acquires images. Images are synced with IMU data from sensors 108. In operation 408, a decision is made whether the camera is tracked (e.g., by a SLAM algorithm). If the answer to operation 408 is no, process returns to operation 404 asking the user to scan the environment by moving the device 100. If the answer to operation 408 is yes, process 400 continues to operation 412.

In operation 412, the camera 104 acquires a new frame (e.g., image) of the scene 116. Depth and normals are estimated using the new frame and a depth and normal module. In operation 416, to generate a depth map and a normal map. Some techniques for estimating depth and normal values are given in Xiaojuan Qi, et al., GeoNet: Geometric Neural Network for Joint Depth and Surface Normal Estimation, IEEE CVPR 2018; D. Eigen, et al., Predicting depth, surface normals and semantic labels with a common multi-scale convolutional architecture, ICCV, 2015; and P. Wang, et al, Surface regularized geometry estimation from a single image, NIPS, 2016.

Depth maps and normal maps estimated from a single image can have ambiguities because many possible world scenes may have produced a given image. Additionally, the depth map can have global scale ambiguity. For example, a normal sized room and a doll house room can produce the same image.

A SLAM module can output a sparse set of points with global scale resolved. For example, the SLAM module can output the sparse set of points with distances (e.g., in centimeters, meters, or feet) based on incorporating IMU data acquired as the camera is moved in operation 404. In operation 420, scale of the depth map and normal map are computed based on aligning the depth map and normal map with the sparse set of points (or a subset of the sparse set of points) based on camera pose. Depth values (e.g., calculated from the center of projection of the camera 104) of the depth map are scaled according to the sparse set of points so that the depth map is scaled to a global scale. Depth maps and normal maps generated over time are transformed into global scale values based on aligning the depth maps and normal maps with the sparse set of points using the pose of the camera 104.

Surface geometry and orientation of surfaces of real objects 120 in the scene 116 are reconstructed using the depth maps and normal maps by generating a mesh (e.g., a polygonal mesh) from depth data in the depth maps and/or normal data in the normal maps, in operation 424. The depth data includes depth values and the scale of the depth value, and the normal data includes normal values and the scale of the normal value. An example of using range data to reconstruct a surface is given in P. Labatut, et al., Robust and Efficient Surface Reconstruction from Range Data, Computer Graphics Forum 28(8): 2275-2290, October 2009. Normal maps can also be aligned with the polygonal mesh.

In operation 428, the virtual object 124 is rendered on the screen 112. The polygonal mesh reconstructed from the real object 120 is used to calculate a collision of the virtual object 124 with the real object 120 and/or to render lighting with the virtual object 124. In some embodiments, the polygonal mesh reconstructed from the real object 120 is used to detect a collision of the virtual object with reconstructed surface geometry of the environment; a response of the collision can be calculated; and/or the virtual object can be rendered after the collision based on the response of the collision that is calculated. To render the virtual object 124 on the screen 112, a ray tracing engine can be used. Primary rays are cast from a camera center through each pixel on an imaging plane. When a primary ray first intersects with geometry of the virtual object or reconstructed geometry of a real object 120, secondary rays are recursively cast from the intersection point. Secondary rays can include reflection ray, refraction ray, and/or shadow ray. A reflection ray is cast in a mirror-reflection direction for specular reflection effects. A refraction ray is cast when the refraction ray intersects with the surface of a transparent object. A shadow ray is cast toward each light source. If a shadow ray towards a light source is blocked by an opaque object, the light source does not illuminate the surface. In some embodiments, a single ray approximation can be replaced with a distribution of rays (DST) to render soft phenomena such as glossy reflections, soft shadow, translucency, etc.

There can be four types of secondary rays during ray tracing in an artificial reality setting:

I: secondary ray cast from geometry of a virtual object that intersects with geometry of a virtual object;

II: secondary ray cast from geometry of a virtual object that intersects with geometry of a real object;

III: secondary ray cast from geometry of a real object that intersects with geometry of a virtual object; and IV: secondary ray cast from geometry of a real object that intersects with geometry of a real object.

Among the four types, type IV is implicitly supported because color influence from a part of real geometry on another part of real geometry is a naturally occurring phenomenon and it is already captured by the camera. Without reconstructed real geometry, only type I is also supported. With reconstructed real geometry, type II is supported. In some embodiments, for type III, refraction and reflections from highly reflective real objects (e.g., a mirror) are not supported because 3D reconstruction of transparent real objects or highly reflective real objects can be computationally intense. Thus the virtual object 124 can be rendered on the screen 112 with lighting of the virtual object 124 determined by light reflected and/or blocked by real objects 120 and/or pixels of real objects 120 can be changed (e.g., darkened, lightened, color tinted, etc.) by light reflected and/or blocked by the virtual object 124. A SLAM algorithm can use visual-inertial odometry (VIO) to estimate camera pose. In addition to pose, the SLAM algorithm can output a set of sparse 3D points with accurate global scale based on incorporation of IMU data. Sparse points from SLAM can be used to compute the global scale of the estimated depth map. For example, for each Pi of the set of sparse points, based on its 3D location and camera pose (both are outputs from SLAM), depth Di from the camera's center of projection can be calculated. Depth value can also be obtained from the estimated depth map di. Then, a scale value si can be computed that scales the depth value from depth map to absolute world scale as follows:

$$S_i = \frac{D_i}{d_i}$$

Scale calculations for some or all points of the sparse set of points obtained by the SLAM algorithm can be performed. Scale calculations can be averaged to obtain an absolute global scale. Pose data can be used to transform depth and/or normal maps captured over time into a common world coordinate frame.

Figure 5:
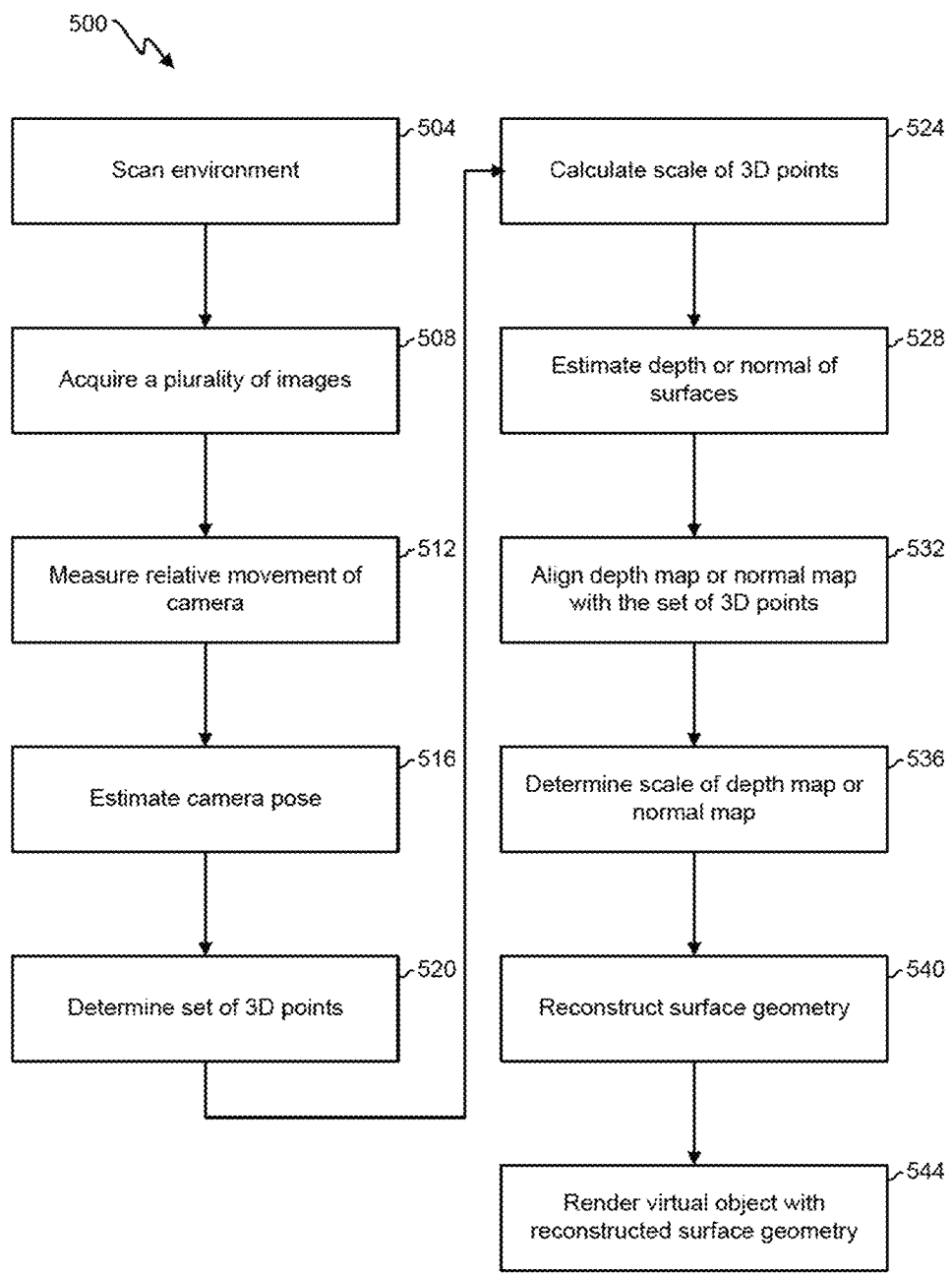
FIG. 5 illustrates a flowchart of another embodiment of a process for rendering of three-dimensional, virtual objects by an augmented-reality system.

FIG. 5 illustrates a flowchart of an embodiment of a process 500 for rendering of three-dimensional, virtual objects in an augmented-reality system. Process 500 begins in operation 504 with guiding a user of an AR system to scan an environment by moving a camera. For example, the user moves device 100 around while pointing the camera 104 at the scene 116, wherein the scene 116 has one or more real objects 120. The user could be at a playground and use a camera from a smartphone to image at playground equipment.

In operation 508, a number of images of the environment are acquired by the camera while the camera is scanning the environment. For example, the camera 104 acquires pictures from different positions of a slide, swings, and bars as the user moves the smartphone.

Relative movement of the camera is measured using an IMU to obtain IMU data, operation 512. Relative movement occurs while the camera 104 is being moved to scan the environment. Camera pose relative to the environment is estimated based on the IMU data and the number of images, operation 516. For example, a SLAM module is used to determine relative position and relative orientation of the smartphone in relation to the playground equipment. In operation 520, a set of 3D points with global scale distances are determined. The SLAM module can produce a sparse set of points of real objects relative to the camera pose based on the number of images and the IMU data. Thus the sparse set of points could include a point on the slide and a point on a seat of the swing. In some embodiments, points of the set of 3D points are determined based on a feature, such as a corner, or at a location of high contrast.

In operation 524, a scale of the 3D points is calculated. In some embodiments, the SLAM module calculates the scale of the 3D points using IMU data. For example, if the distance between two poses of the camera 104 is known, and images acquired by the camera 104 have overlapping fields of view, then distances from the camera to real objects in the overlapping fields of view can be calculated based on a stereo image algorithm (e.g., using perspective projection, triangulation, etc.). Thus the device 100 can determine how far (e.g., in meters and relative angle) the device 100 is from the point on the slide, how far and relative angle the device 100 is from the point on the seat of the swing, and how far and relative angle the point on the slide is from the point on the seat of the swing.

Depths and/or normals of surfaces in the environment relative to the camera are estimated based on the number of images to obtain a depth map and/or a normal map of the environment, in operation 528. In other words, at least one of the depths of surfaces in the environment relative to the camera and the normals of surfaces in the environment relative to the camera is estimated based on the images. As such, at least one of the depth map and the normal map of the environment is acquired. For example, machine learning algorithms are used to identify the slide, swings, and bars. The depth map provides relative distances from the device 100 to the playground equipment, including to the slide, swings, and bars. The normal map provides relative surface orientations of playground equipment relative to the device 100, including surface orientations of the slide, swings, and bars.

The depth map and normal maps based on machine learning do not have scale. For example, the depth map and the normal map could be used for a doll house play structure as well has for a life-size play structure. In operation 532, the depth map and/or the normal map are aligned with the set of 3D points. As such, the scale of the depth map and/or the scale of the normal map is determined. Thus the point on the slide of the set of 3D points corresponds to a similar point of the slide in the depth map and in the normal map. Known relative pose of the camera 104 to the set of 3D points, and the known relative pose of the camera to the depth map and the normal map, can be used to align the set of 3D points with the depth map and the normal map. By aligning the set of 3D points with the depth map and the normal map, a scale of the depth map and of the normal map can be determined because scale of the set of 3D points is known. In this way, the depth map is aligned with the normal map.

In operation 540, surface geometry of the environment is reconstructed using the depth map, the normal map, the scale of the depth map, and/or the scale of the normal map. For example, reconstructed surface geometry provides a mesh (e.g., a polygonal mesh, such as a triangle mesh) with point locations determined by the depth map and surface orientations determined by the normal map. For example, a triangle mesh is used to digitally reconstruct the slide, the swings, and the bars of the playground equipment. In some embodiments, the mesh is a high poly count mesh.

With the mesh generated, the virtual object 124 can be rendered in the environment, operation 544. The virtual object 124 is rendered in the environment using the surface geometry reconstructed from the depth map and/or the normal map, i.e., the reconstructed surface geometry of the environment (e.g., the polygonal mesh). Lighting of the virtual object and of the environment, as well as collisions of the virtual object with the real environment, can be generated using the virtual object interacting with the polygonal mesh. In some embodiments, shadows on the virtual object in the environment are changed based on ray tracing of light interacting with the reconstructed surface geometry of the environment. The virtual object with the shadows changed may be rendered on the screen. In some embodiments, shadows on real objects in the environment are changed based on ray tracing interacting with the virtual object. The reconstructed real objects with the shadows changed may be rendered on the screen. For example, a virtual ball can be placed on the slide. The ball can be rendered to roll down the slide while a shadow of the ball on the slide, as well as reflections from the slide on the ball, are updated and presented on the screen 112 to the user. Lighting and interactions of the ball with the slide can be calculated using ray tracing and the mesh.

In some embodiments, both a depth map and a normal map are estimated from the number of images; both the depth map and the normal map are aligned with the set of 3D points; and both the depth map and the normal map are used for reconstructing surface geometry of objects in the scene. In some embodiments, the depth map is estimated from the number of images and the normal map is generated using geometry reconstructed from the depth map and the set of 3D points; or the normal map is estimated from a number of images, and the depth map is generated using geometry reconstructed from the normal map and the set of 3D points.

A number of variations and modifications of the disclosed embodiments can also be used. For example, planar surfaces could be fit to the sparse set of 3D points, approximating the real objects, wherein the planar surfaces have positions and orientations.

Figure 6:
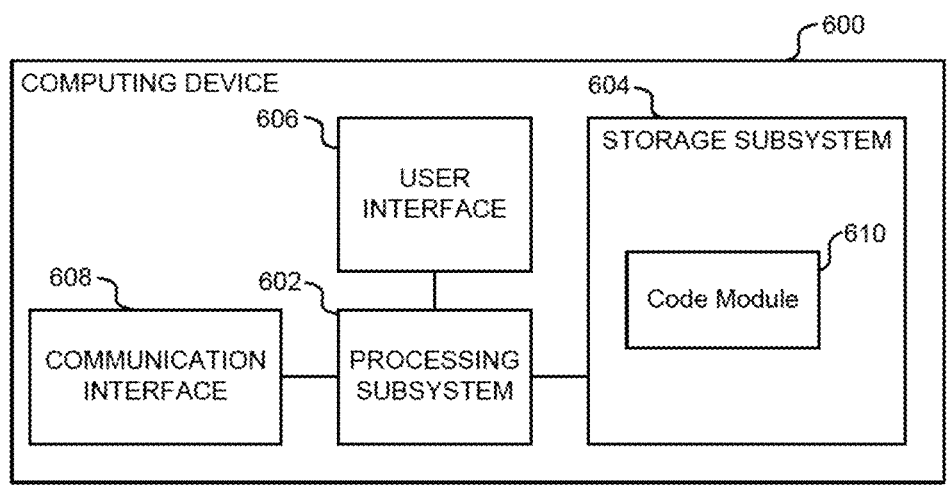
FIG. 6 depicts a block diagram of an embodiment of a computer system.

FIG. 6 is a simplified block diagram of a computing device 600. Computing device 600 can implement some or all functions, behaviors, and/or capabilities described above that would use electronic storage or processing, as well as other functions, behaviors, or capabilities not expressly described. Computing device 600 includes a processing subsystem 602, a storage subsystem 604, a user interface 606, and/or a communication interface 608. Computing device 600 can also include other components (not explicitly shown) such as a battery, power controllers, and other components operable to provide various enhanced capabilities. In various embodiments, computing device 600 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 604 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 604 can store one or more applications and/or operating system programs to be executed by processing subsystem 602, including programs to implement some or all operations described above that would be performed using a computer. For example, storage subsystem 604 can store one or more code modules 610 for implementing one or more method operations described above.

A firmware and/or software implementation may be implemented with modules (e.g., procedures, functions, and so on). A machine-readable medium tangibly embodying instructions may be used in implementing methodologies described herein. Code modules 610 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 610) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, operations and means described above may be done in various ways. For example, these techniques, blocks, operations and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 610 may include sets of instructions (codes) embodied on a computer-readable medium that directs a processor of a computing device 600 to perform corresponding actions. The instructions may be configured to run in sequential order, in parallel (such as under different processing threads), or in a combination thereof. After loading a code module 610 on a general purpose computer system, the general purpose computer is transformed into a special purpose computer system.

Computer programs incorporating various features described herein (e.g., in one or more code modules 610) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 604 can also store information useful for establishing network connections using the communication interface 608.

User interface 606 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 606 to invoke the functionality of computing device 600 and can view and/or hear output from computing device 600 via output devices of user interface 606. For some embodiments, the user interface 606 might not be present (e.g., for a process using an ASIC).

Processing subsystem 602 can be implemented as one or more processors (e.g., integrated circuits, one or more single-core or multi-core microprocessors, microcontrollers, central processing unit, graphics processing unit, etc.). In operation, processing subsystem 602 can control the operation of computing device 600. In some embodiments, processing subsystem 602 can execute a variety of programs in response to program code and can maintain multiple concurrently executing programs or processes. At a given time, some or all of a program code to be executed can reside in processing subsystem 602 and/or in storage media, such as storage subsystem 604. Through programming, processing subsystem 602 can provide various functionality for computing device 600. Processing subsystem 602 can also execute other programs to control other functions of computing device 600, including programs that may be stored in storage subsystem 604.

Communication interface 608 can provide voice and/or data communication capability for computing device 600. In some embodiments, communication interface 608 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 608 can provide wired connectivity (e.g., universal serial bus, Ethernet, universal asynchronous receiver/transmitter, etc.) in addition to, or in lieu of, a wireless interface. Communication interface 608 can be implemented using a combination of hardware (e.g., driver circuits, antennas, modulators/demodulators, encoders/decoders, and other analog and/or digital signal processing circuits) and software components. In some embodiments, communication interface 608 can support multiple communication channels concurrently. In some embodiments the communication interface 608 is not used.

It will be appreciated that computing device 600 is illustrative and that variations and modifications are possible. A computing device can have various functionality not specifically described (e.g., voice communication via cellular telephone networks) and can include components appropriate to such functionality.

Further, while the computing device 600 is described with reference to particular blocks, it is to be understood that these blocks are defined for convenience of description and are not intended to imply a particular physical arrangement of component parts. For example, the processing subsystem 602, the storage subsystem, the user interface 606, and/or the communication interface 608 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 600.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in the figure. A process may correspond to a method, a function, a procedure, a subroutine, a subprogram, etc.

A recitation of "a", "an", or "the" is intended to mean "one or more" unless specifically indicated to the contrary. Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

It should be understood that the detailed description and specific examples, while indicating various embodiments, are intended for purposes of illustration only and are not intended to necessarily limit the scope of the disclosure.

Documents listed are incorporated by reference. None are admitted to be prior art.

The invention claimed is:

1. A system for augmented reality rendering of three-dimensional and virtual objects, the system comprising:
   a camera;
   an inertial measurement unit (IMU); and
   a memory device having instructions that when executed cause one or more processors to perform the following operations:
   estimating, based on a plurality of images acquired by the camera, at least one of depth and normal of surfaces in an environment relative to the camera, to obtain at least one of a depth map and a normal map of the environment;
   aligning the at least one of the depth map and the normal map with a set of three-dimensional points, to determine at least one of a scale of the depth map and a scale of the normal map, wherein the set of three-dimensional points are calculated based on the plurality of images and data from the IMU;
   reconstructing a surface geometry of the environment using the at least one of the depth map and the normal map and the at least one of the scale of the depth map and the scale of the normal map; and rendering a virtual object in the environment using the reconstructed surface geometry of the environment.

2. The system of claim 1, wherein the memory device comprises instructions that when executed cause the one or more processors to perform the following operations:

estimating, based on the plurality of images, both the depth and the normal of surfaces in the environment relative to the camera, to obtain both the depth map and the normal map of the environment;

aligning both the depth map and the normal map with the set of three-dimensional points, to determine the scale of the depth map and the scale of the normal map; and reconstructing the surface geometry of the environment using both the depth map, the scale of the depth map, the normal map and the scale of the normal map.

3. The system of claim 1, wherein the depth map comprises a plurality of depth values per pixel of the images captured by the camera and the normal map comprises a plurality of normal values per pixel of the images captured by the camera.

4. The system of claim 1, wherein rendering the virtual object in the environment comprises:

changing shadows on the virtual object in the environment based on ray tracing of light interacting with the surface geometry of the environment.

5. The system of claim 1, wherein rendering the virtual object in the environment comprises:

changing shadows on real objects in the environment based on ray tracing interacting with the virtual object.

6. The system of claim 1, wherein the memory device comprises instructions that when executed cause the one or more processors to perform the following operation:

estimating, based on the plurality of images, the normal of surfaces in the environment relative to the camera, to obtain the normal map; and reconstructing the depth map from the set of three-dimensional points and the normal map.

7. The system of claim 1, wherein the memory device comprises instructions that when executed cause the one or more processors to perform the following operation:

estimating, based on the plurality of images, the normal of surfaces in the environment relative to the camera, to obtain the depth map; and reconstructing the normal map from the set of three-dimensional points and the depth map.

8. The system of claim 1, wherein the memory device comprises instructions that when executed cause the one or more processors to perform the following operations:

detecting a collision of the virtual object with the reconstructed surface geometry of the environment;

computing a response of the collision; and rendering the virtual object after the collision.

9. A method for augmented reality rendering of three-dimensional and virtual objects, the method comprising:

estimating, based on a plurality of images acquired by a camera, at least one of depth and normal of surfaces in an environment relative to the camera, to obtain at least one of a depth map and a normal map of the environment;

aligning the at least one of the depth map and the normal map with a set of three-dimensional points, to determine at least one of a scale of the depth map and a scale of the normal map, wherein the set of three-dimensional points are calculated based on the plurality of images and data from an inertial measurement unit (IMU);

reconstructing a surface geometry of the environment using the at least one of the depth map and the normal map and the at least one of the scale of the depth map and the scale of the normal map; and rendering a virtual object in the environment using the reconstructed surface geometry of the environment.

10. The method of claim 9, wherein the estimating, based on a plurality of images acquired by the camera, at least one of depth and normal of surfaces in an environment relative to a camera to obtain at least one of a depth map and a normal map of the environment, comprises:

estimating, based on the plurality of images, both the depth and the normal of surfaces in the environment relative to the camera, to obtain both the depth map and the normal map of the environment;

wherein the aligning the at least one of the depth map and the normal map with a set of three-dimensional points to determine the at least one of a scale of the depth map and a scale of the normal map, comprises:

aligning both the depth map and the normal map with the set of three-dimensional points, to determine both the scale of the depth map and the scale of the normal map; and wherein the reconstructing a surface geometry of the environment using the at least one of the depth map and the normal map and the at least one of the scale of the depth map and the scale of the normal map, comprises:

reconstructing the surface geometry of the environment using both the depth map and the normal map and both the scale of the depth map and the scale of the normal map.

11. The method of claim 9, wherein the rendering a virtual object in the environment using the reconstructed surface geometry of the environment, comprises:

changing shadows on the virtual object in the environment based on ray tracing of light interacting with the reconstructed surface geometry of the environment.

12. The method of claim 9, wherein the estimating, based on a plurality of images acquired by a camera, at least one of depth and normal of surfaces in an environment relative to the camera to obtain at least one of a depth map and a normal map of the environment, comprises:

estimating, based on the plurality of images, the depth of surfaces in the environment relative to the camera, to obtain the depth map; and wherein the method further comprises:

reconstructing the normal map from the set of three-dimensional points and the depth map.

13. The method of claim 9, wherein the rendering a virtual object in the environment using the reconstructed surface geometry of the environment, comprises:

detecting a collision of the virtual object with reconstructed surface geometry of the environment;

computing a response of the collision; and rendering the virtual object after the collision rendering a collision of the virtual object with the reconstructed surface geometry of the environment.

14. The method of claim 9, wherein the rendering a virtual object in the environment using the reconstructed surface geometry of the environment, comprises:

changing shadows on real objects in the environment based on ray tracing interacting with the virtual object.

15. A non-transitory memory device having instructions for augmented reality rendering of three-dimensional, virtual objects, that when executed cause one or more processor to perform the following steps:

estimating, based on a plurality of images acquired by a camera, at least one of depth and normal of surfaces in an environment relative to the camera, to obtain a depth map or a normal map of the environment;

aligning the at least one of the depth map and the normal map with a set of three-dimensional points, wherein the set of three-dimensional points are calculated based on the plurality of images and data from an inertial measurement unit (IMU);

determining at least one of a scale of the depth map and a scale of the normal map based on aligning the at least one of the depth map and the normal map with the set of three-dimensional points;

reconstructing a surface geometry of the environment using the at least one of the depth map and the normal map and the at least one of the scale of the depth map and the scale of the normal map; and rendering a virtual object in the environment using the reconstructed surface geometry of the environment.

16. The non-transitory memory device of claim 15, wherein the memory device comprises instructions that when executed cause the one or more processors to perform the following operations:

estimating, based on the plurality of images, both depth and normal of surfaces in the environment relative to the camera, to obtain both the depth map and the normal map of the environment;

aligning both the depth map and the normal map with the set of three-dimensional points, to determine the scale of the depth map and the scale of the normal map; and reconstructing the surface geometry of the environment using both the depth map, the scale of the depth map, the normal map, and the scale of the normal map.

17. The non-transitory memory device of claim 15, wherein rendering the virtual object in the environment comprises:

changing shadows on the virtual object in the environment based on ray tracing of light interacting with the reconstructed surface geometry of the environment.

18. The non-transitory memory device of claim 15, wherein the memory device comprises instructions that when executed cause the one or more processors to perform the following operations:

estimating, based on the plurality of images, the normal of surfaces in the environment relative to the camera, to obtain the normal map; and reconstructing the depth map from the set of three-dimensional points and the normal map.

19. The non-transitory memory device of claim 15, wherein the memory device comprises instructions that when executed cause the one or more processors to perform the following operations:

detecting a collision of the virtual object with reconstructed surface geometry of the environment;

computing a response of the collision; and rendering the virtual object after the collision.

20. The non-transitory memory device of claim 15, wherein rendering the virtual object in the environment comprises changing shadows on real objects in the environment based on ray tracing interacting with the virtual object.

* * * * *